US010435309B2

(12) United States Patent
Jeon et al.

(10) Patent No.: US 10,435,309 B2
(45) Date of Patent: Oct. 8, 2019

(54) PROCESS AND DEVICE FOR REMOVING IODINE USING GOLD PARTICLES

(71) Applicant: KOREA ATOMIC ENERGY RESEARCH INSTITUTE, Daejeon (KR)

(72) Inventors: Jong Ho Jeon, Incheon (KR); Mi Hee Choi, Jeollabuk-do (KR); Ha Eun Sim, Daejeon (KR); Seong Jae Yun, Jeollabuk-do (KR); Sang Hyun Park, Seoul (KR); Beom Su Jang, Daejeon (KR); Dae Seong Choi, Jeollabuk-do (KR); Dong Eun Lee, Jeollabuk-do (KR); Eui Baek Byun, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 15/493,459

(22) Filed: Apr. 21, 2017

(65) Prior Publication Data
US 2017/0305760 A1    Oct. 26, 2017

(30) Foreign Application Priority Data

Apr. 22, 2016   (KR) .................. 10-2016-0049270
Mar. 28, 2017   (KR) .................. 10-2017-0039528

(51) Int. Cl.
*C02F 1/28*    (2006.01)
*B01D 15/08*   (2006.01)
(Continued)

(52) U.S. Cl.
CPC .............. *C02F 1/281* (2013.01); *B01D 15/08* (2013.01); *B01J 20/02* (2013.01); *B01J 20/24* (2013.01);
(Continued)

(58) Field of Classification Search
None
See application file for complete search history.

(56) References Cited

U.S. PATENT DOCUMENTS 4,615,806 A      10/1986 Hilton
2011/0311438 A1*  12/2011 Pachauri .............. B01J 19/0093
                                              423/622
(Continued)

FOREIGN PATENT DOCUMENTS

CN    105727910 A  *  7/2016
JP    2013-140081 A    7/2013
(Continued)

OTHER PUBLICATIONS

Amoli-Diva et al, "Gold nanoparticle grafted modified silica gel as new stationary phase . . . ", Journal f food and drug analysis, 23 (2015) 279-286; Feb. 2015.*

*Primary Examiner* — Krishnan S Menon
(74) *Attorney, Agent, or Firm* — Mintz Levin Cohn Ferris Glovsky and Popeo, P.C.; Peter F. Corless

(57) ABSTRACT

A process for removing iodine using gold particles includes contacting a solution including iodine, with gold particles. The iodine is adsorbed onto the gold particles and then removed. A device for removing iodine using gold particles includes gold particles in a stationary phase and is configured to contact a solution including iodine, with gold particles, to thus adsorb the iodine onto the gold particles and remove the iodine.

10 Claims, 8 Drawing Sheets
(5 of 8 Drawing Sheet(s) Filed in Color)

(51) Int. Cl.
    *B01J 20/02*         (2006.01)
    *B01J 20/28*         (2006.01)
    *B01J 20/24*         (2006.01)
    *B01J 20/281*       (2006.01)
    *C02F 101/12*      (2006.01)
    *C02F 101/00*      (2006.01)
    *C02F 103/00*      (2006.01)

(52) U.S. Cl.
    CPC ....... *B01J 20/281* (2013.01); *B01J 20/28004* (2013.01); *B01J 20/28007* (2013.01); *B01J 20/28016* (2013.01); *B01J 20/28033* (2013.01); *B01J 2220/52* (2013.01); *C02F 2101/006* (2013.01); *C02F 2101/12* (2013.01); *C02F 2103/003* (2013.01)

(56) References Cited

U.S. PATENT DOCUMENTS

| | | | |
|---|---|---|---|
| 2013/0090264 A1* | 4/2013 | Isozaki | B01J 23/52 506/22 |
| 2015/0274689 A1* | 10/2015 | Ishida | B01J 38/56 549/241 |

FOREIGN PATENT DOCUMENTS

| | | |
|---|---|---|
| JP | 2014-130093 A | 7/2014 |
| KR | 1986-0007005 | 10/1986 |

\* cited by examiner

PROCESS AND DEVICE FOR REMOVING IODINE USING GOLD PARTICLES

CROSS-REFERENCE TO RELATED APPLICATION

This application claims the benefit of priority to Korean Patent Application No. 10-2016-0049270, filed on Apr. 22, 2016 and Korean Patent Application No. 10-2017-0039528, filed on Mar. 28, 2017 with the Korean Intellectual Property Office, the entirety of which is incorporated herein by reference.

BACKGROUND

The present disclosure relates to a process and a device for removing iodine using gold particles, and, more particularly, to a process and a device for removing iodine using gold particles which may be applied to remove iodine present in various types of solution, specifically and efficiently, within a short time, using the strong binding properties of iodine and gold particles.

Various types of iodine compound included in waste water are present as isotope compounds of various iodine elements, having masses of 123, 124, 125, 127, 129, 131, 132, 133, etc. The chemical behaviors of iodine compounds are the same, while iodine elements having masses of 123, 124, 125, 129, 131, 132, and 133 are radioactive as radioisotopes. Such radioactive iodine has been utilized in the treatment and diagnosis of serious diseases, such as thyroid cancer or the like, in the clinical field for the past several decades, and has been widely used in various radiation related industries and biological studies. For example, iodine-123, iodine-124, and iodine-125 are mainly used as isotopes for diagnosis, and iodine-131 is being utilized as an isotope for treatment elements typically used in clinical practice. As the utilization of radioactive iodine continues to increase in a variety of fields, additionally generated radioactive iodine waste has also increased significantly.

In recent years, as thyroid cancer patients have increased greatly, the amount of iodine-131 used, in particular, for the treatment of thyroid cancer has increased rapidly. In addition, the leakage of iodine-131, which was leaked in large quantities during the Fukushima, Japan nuclear power plant accident in 2011, is recognized as a major disaster globally, and it is known that no complete solution has been found so far. When such radioactive iodine is absorbed indiscriminatedly in the human body in large amounts, cancer, inappropriate production of hormones, or the like may occur, and environmental pollution may also become serious. Therefore, it may be very important to efficiently treat and remove radioactive iodine waste discharged into the environment.

As a typical radioactive iodine removal technique currently used, there is a method of adsorbing and removing radioactive iodine in water by using activated carbon. However, this method requires the use of relatively bulky, activated carbon. Therefore, a new type of solid radioactive waste may continue to be generated, and removal efficiency thereof may be low. As another method, a technique utilizing silver, in which silver is reacted with radioactive iodine to induce precipitation of the radioactive element, with the radioactive iodine being subsequently removed, has been used. However, silver may be easily adsorbed onto other halogen ions, for example, chlorine (Cl—), so it is known that this another method, also, has poor removal efficiency of radioactive iodine and requires relatively high costs, compared to other methods.

In this regard, Korean Patent Application No. 1986-0001581 discloses a method of removing an iodized compound from a non-aqueous organic medium, which includes contacting a medium containing an iodized compound with an ion-exchange resin, which is a strong acid cation exchange resin having a macroreticular structure that is stable in an organic medium, and of which at least 1% of an active portion is converted into a silver or hydrargyrum form. However, continuous iteration of the method is very difficult to perform, and the method requires a great deal of precipitation time, as well as measures to remove the precipitates reliably. If precipitates are not clearly removed, the overall iodine removal efficiency may be reduced. In particular, the method is not economical because it uses expensive silver compounds.

Moreover, a method of selectively removing radioactive iodine present in water by using bentonite, containing ionic copper, has been recently developed. However, the radioactive iodine removal efficiency of this method is not high, and a relatively long time is required to remove the radioactive iodine. Thus, if a method of removing iodine in an economical, specific, and efficient manner, within a short period of time, is developed, the method is expected to be usefully applied in related fields.

SUMMARY

An aspect of the present disclosure may provide a process for removing iodine present in various solutions, using the strong binding properties of iodine and gold particles.

Another aspect of the present disclosure may provide a process for removing iodine from waste water, which may remove iodine present in waste water, using the strong binding properties of iodine and gold particles.

Another aspect of the present disclosure may provide a device for removing iodine present in various solutions, using the strong binding properties of iodine and gold particles.

According to an aspect of the present disclosure, a process for removing iodine using gold particles may include contacting a solution, including iodine, with gold particles, in which the iodine may be adsorbed onto the gold particles and then removed from the solution.

According to another aspect of the present disclosure, a process for removing iodine from waste water may be performed by the process for removing iodine using gold particles according to an embodiment.

According to another aspect of the present disclosure, a device for removing iodine using gold particles may include gold particles in stationary phase, and may be configured to contact a solution, including iodine, with the gold particles, to adsorb iodine onto the gold particles and remove iodine.

BRIEF DESCRIPTION OF DRAWINGS

The patent or application file contains at least one drawing executed in color. Copies of this patent or patent application publication with color drawings will be provided by the Office upon request and payment of the necessary fee.

The above and other aspects, features, and advantages of the present disclosure will be more clearly understood from the following detailed description, taken in conjunction with the accompanying drawings, in which.

DETAILED DESCRIPTION

Figure 1:
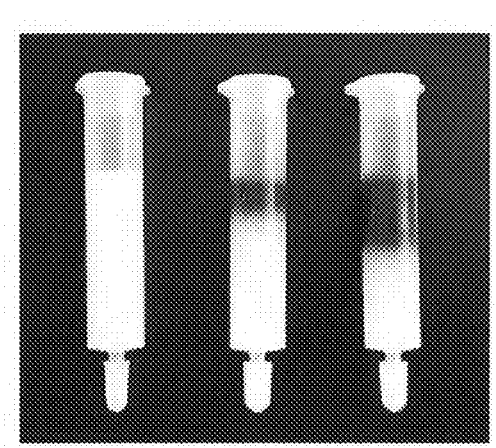
FIG. 1 illustrates photographs of a PD-10 column (left) not filled with gold nanoparticles (GNPs), a PD-10 column (middle) filled with 10 mL of GNPs, having an average particle diameter of 13 nm, and a PD-10 column (right) filled with 30 mL of GNPs, having an average particle diameter of 13 nm.

Hereinafter, embodiments of the present disclosure will be described with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As used herein, the term "and/or" includes any and all combinations of one or more of the associated, listed items.

It will be apparent that, although the terms 'first,' 'second,' 'third,' etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s), as shown in the figures. It will be understood that spatially relative terms are intended to encompass different orientations of the device in use or operation, in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations, depending on a particular directional orientation of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape resulting from manufacturing. The following embodiments may also be constituted alone or as a combination of several or all thereof.

The contents of the present disclosure described below may have a variety of configurations, and only a required configuration is proposed herein, but the present disclosure is not limited thereto.

According to an example, iodine, a material to be removed, may be commonly present in an aqueous solution in iodine cation ($I^+$) form, as well as in iodine anion ($I^-$) form, iodine ($I_2$) form, and iodate ion ($IO_3^-$) form. Because of such various chemical forms, it may be difficult to remove iodine from an aqueous solution or from waste water.

The term "iodine", as used herein, includes all types of iodine, as well as including a process for removing an iodine compound mixed with various forms of iodine.

A process for removing iodine using gold (Au) particles according to an example may include adsorbing iodine onto gold particles and removing the iodine by contacting a solution including the iodine with the gold particles.

For example, a process for removing iodine using gold particles according to an example may include providing gold particles in stationary phase, and contacting, in mobile phase, a solution including iodine, with the gold particles in stationary phase.

The solution including iodine may be an aqueous solution, an organic solvent solution or a combination thereof, and may include, for example, urine or seawater. A type of the solution is not particularly limited.

The present disclosure may exhibit an excellent iodine removal effect in all cases in which the aqueous solution is an acidic solution, a neutral solution, or a basic solution.

The organic solvent solution is not particularly limited, and may be, for example, an organic solvent, including ethanol, dimethyl sulfoxide or the like, or a mixture thereof.

The gold particles are not limited in form, and may be formed in, for example, particle form, having an average particle diameter of 1 nm to 1 μm, and preferably of 10 nm to 100 nm. When the average particle diameter is less than 1 nm, it may be difficult to produce the gold particles. When the average particle diameter is greater than 1 μm, a surface area of each of the gold particles may be reduced, and a removal rate of iodine per an amount of provided gold particles may thus tend to decrease.

For example, the providing of the gold particles in stationary phase may be performed by immobilizing the gold particles on a column or on a membrane filter.

In more detail, the gold particles may be poured into the column to immobilize the gold particles on the column. A column that can be used when the gold particles may be poured into the column is not particularly limited, as long as the column is able to immobilize the gold particles, preventing the gold particles from being eluted or diffused. More specifically, the column may be a Sephadex® G-25 PD-10 desalting column.

The membrane filter may be formed of, for example, a material that may adsorb gold nanoparticles (GNPs) by an electrical interaction or a covalent bond, and may include, for example, an element, such as oxygen (O), nitrogen (N), or sulfur (S), having an unshared electron pair, or may be formed of, for example, a natural polymeric material based on sugar or amino sugar monomers.

In more detail, the natural polymeric material including sugar or amino sugar monomers may be at least one selected from the group consisting of starch, cellulose, chitosan and hyaluronic acid, or derivatives thereof. For example, cellulose acetate or nitrocellulose may be used as the natural polymeric material.

When a pore size of the membrane filter is greater than that of the GNPs, the GNPs may be immobilized on the membrane filter by the electrical interaction between the membrane filter and the GNPs, as described above.

According to an example, the iodine, a material to be adsorbed and removed, may be at least one selected from the group consisting of iodine anions ($I^-$), iodine cations ($I^+$), iodate ions ($IO_3^-$) and iodine ($I_2$), or a mixture thereof.

Further, the targeted iodine may include an isotope compound of various iodine elements having masses of 123, 124, 125, 127, 129, 131, 132, 133, etc., or a mixture thereof. For example, the process for removing iodine using gold particles according to an example may target both non-radioactive iodine and radioactive iodine.

Moreover, the solution including iodine may be in liquid or gas phase, and is not limited in phase.

A concentration of non-radioactive iodine included in the solution including iodine may range, preferably, from 0.001 µM to 100 µM, and more preferably, from 1 µM to 10 µM. When the concentration of iodine included in the solution including iodine is greater than 100 µM, the removal rate of the iodine may tend to decrease. Further, an amount of the radioactive iodine included in the solution including iodine may range preferably from 0.1 microcurie (µCi) to 5 millicurie (mCi), and, more preferably, from 1 µCi to 1 mCi.

Figure 4:
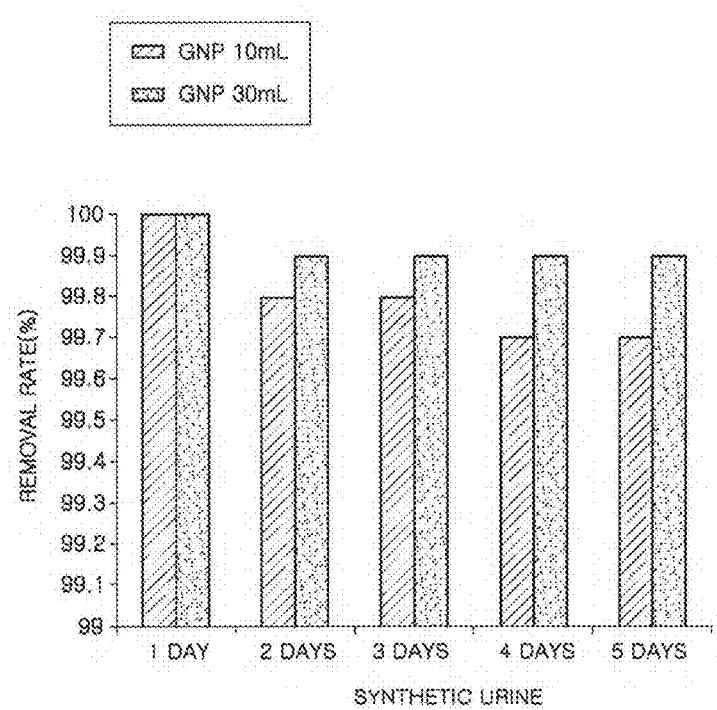
FIG. 4 illustrates a graph of results in which radioactive iodine is removed from synthetic urine over a period of 5 days using a PD-10 column filled with GNPs.
Figure 5:
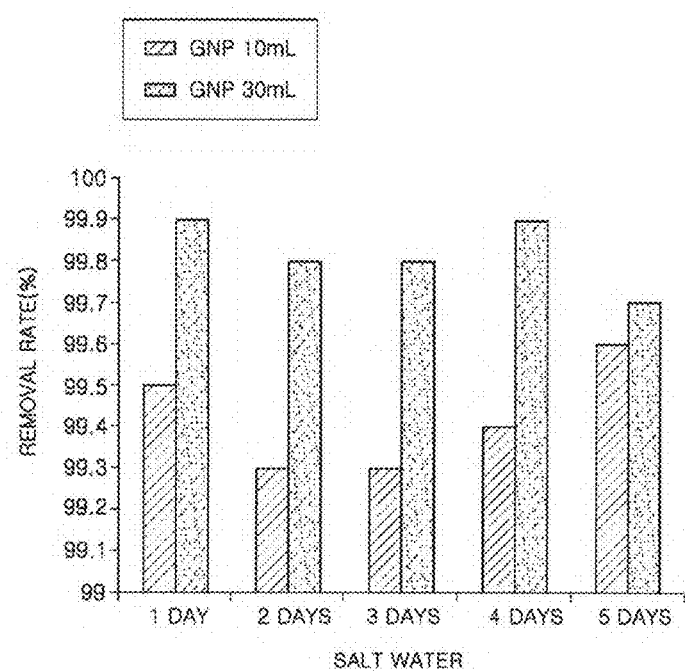
FIG. 5 illustrates a graph of results in which radioactive iodine is removed from seawater over a period of 5 days using a PD-10 column filled with GNPs.
Figure 9:
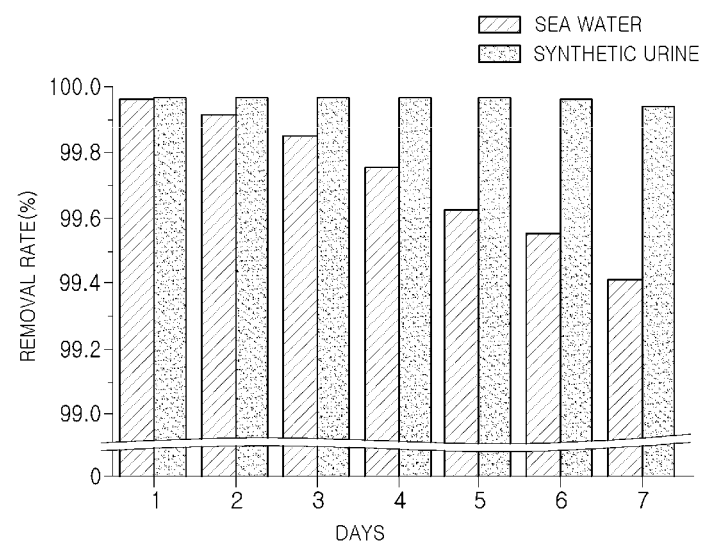
FIG. 9 illustrates results of a reusability test of a filter adsorbed with GNPs, and a removal rate of radioactive iodine present in seawater and synthetic urine over a period of 7 days, at a 24 hour interval.

The process for removing iodine using gold particles according to an example may be repeated while maintaining an excellent iodine removal rate over a period of days, as illustrated in FIGS. 4, 5, and 9.

According to another aspect of the present disclosure, a process for removing iodine from waste water, performed by using the process for removing iodine using gold particles according to an example, for example, a waste water treatment process for removing iodine, may be provided.

Descriptions related to the process for removing iodine using gold particles that are employed in the process for removing iodine from waste water may be the same as those described above. The waste water may include all types of waste water discharged to the environment after being used for a specific purpose, for example, various types of waste water generated in large general hospitals, or in industrial facilities such as factories or the like.

For example, the process for removing iodine using gold particles may exhibit an excellent iodine removal rate even when iodine is present in various types of solution, such as an aqueous solution, an organic solvent solution or the like, as can be seen in the following example. Further, the process for removing iodine using gold particles may also exhibit an excellent iodine removal rate when the aqueous solution is pure, acidic, neutral, or basic. The process for removing iodine using gold particles may be effectively applied without limitations to remove iodine from various types of waste water discharged under a wide range of conditions.

According to another aspect of the present disclosure, a device for removing iodine using gold particles may be provided. The device for removing iodine using gold particles according to an example may include gold particles in stationary phase, and may be configured to contact a solution including iodine with the gold particles to thus adsorb the iodine onto the gold particles and remove the iodine.

Descriptions related to the gold particles and the iodine associated with the device for removing iodine using gold particles may be the same as those described above in the process for removing iodine using gold particles.

In more detail, the gold particles are not limited in form, and may be formed in, for example, particle form, having an average particle diameter of 1 nm to 1 µm, and preferably of 10 nm to 100 nm. When the average particle diameter is less than 1 nm, it may be difficult to produce the gold particles. When the average particle diameter is greater than 1 µm, a surface area of each of the gold particles may be reduced, and a removal rate of iodine per an amount of provided gold particles may thus tend to decrease.

For example, the stationary phase may be formed using a column or a membrane filter. In more detail, the gold particles may be poured into the column or the membrane filter to immobilize the gold particles on the column or the membrane filter.

A column that can be used when the gold particles may be poured into the column is not particularly limited, as long as the column is able to immobilize the gold particles, preventing the gold particles from being eluted or diffused. A cross-linked dextran column may be used. The column may be, for example, a Sephadex® G-25 PD-10 desalting column.

The membrane filter may be formed of, for example, a material that may adsorb gold nanoparticles (GNPs) with an electrical interaction or a covalent bond, and may include, for example, an element, such as oxygen (O), nitrogen (N), or sulfur (S), having an unshared electron pair, or may be formed of, for example, a natural polymeric material based on sugar or amino sugar monomers.

In more detail, the natural polymeric material including sugar or amino sugar monomers may be at least one selected from the group consisting of starch, cellulose, chitosan, and hyaluronic acid, or derivatives thereof. For example, cellulose acetate or nitrocellulose may be used as the natural polymeric material.

When a pore size of the membrane filter is greater than that of the GNPs, the GNPs may be immobilized on the membrane filter by the electrical interaction between the membrane filter and the GNPs, as described above.

In particular, when the membrane filter as described above is used, a radioactive iodine desalting device may be manufactured within a short period of time, compared to using the column; a large amount of radioactive iodine-contaminated water may be subjected to a desalting treatment within a short period of time; and a relatively high radioactive iodine removal rate may continue to be obtained.

Moreover, when the membrane filter as described above is used, two or more membrane filters may be stacked, if desired, to increase the radioactive iodine removal rate. The membrane filter may thus be applied flexibly in number, depending on pollution environments.

According to an example, the iodine, the material to be adsorbed and removed, may be at least one selected from the group consisting of iodine anions ($I^-$), iodine cations ($I^+$), iodate ions ($IO_3^-$) and iodine ($I_2$), or a mixture thereof.

Further, the iodine may include an isotope compound of various iodine elements, having masses of 123, 124, 125, 127, 129, 131, 132, 133, etc., or a mixture thereof. For example, the iodine may include both non-radioactive iodine and radioactive iodine.

Moreover, the solution including iodine may be in liquid or gas phase, and is not limited in phase.

According to an example, the used column, membrane filter, and gold (nano)particles may be materials that may be synthesized in large quantities at low costs, and are further known as having low biotoxicity, to thus be very beneficial in terms of cost and environment, being applied very effectively to remove radioactive iodine from waste water generated in large hospitals or industrial facilities in the future.

Hereinafter, the present disclosure will be described through specific examples thereof in more detail. The following examples are given only for a better understanding of the present disclosure, and the scope of the present disclosure is not limited thereto.

Examples

1. Immobilization of Gold Particles Using Cross-Linked Dextran

Gold particles were immobilized on a PD-10 desalting column to remove radioactive iodine present in a solution. GNPs were used as the gold particles. It could be confirmed that, when 10 mL or 30 mL of GNPs, having a concentration of 10 nM and an average particle diameter of 13 nm and capped with sodium citrate, were poured into the PD-10 desalting column filled with cross-linked dextran, and then the PD-10 desalting column was washed with 50 mL of water, the PD-10 desalting column was filled with the GNPs, as illustrated in FIG. 1.

It could be confirmed that the GNPs, immobilized as described above, were prevented from being eluted or diffused from the cross-linked dextran included in the PD-10 desalting column and had relatively high stability without being aggregated for a long period of time (more than two weeks). FIG. 1 illustrates photographs of a PD-10 column (left) not filled with GNPs, a PD-10 column (middle) filled with 10 mL of GNPs, having an average particle diameter of 13 nm, and a PD-10 column (right) filled with 30 mL of GNPs, having an average particle diameter of 13 nm.

2. Iodine Removal Test Using Cross-Linked Dextran (1) Test Process

Figures 2A, 2B:
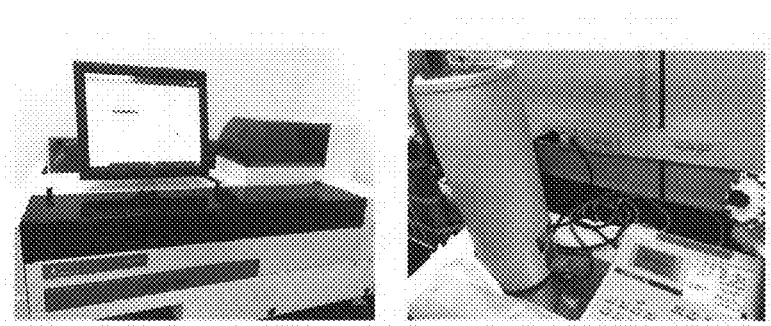
FIGS. 2A and 2B illustrate devices for measuring radioactive iodine values, a gamma (γ)-counter and a radioisotope calibrator of radioactive iodine values, respectively.
Figure 3:
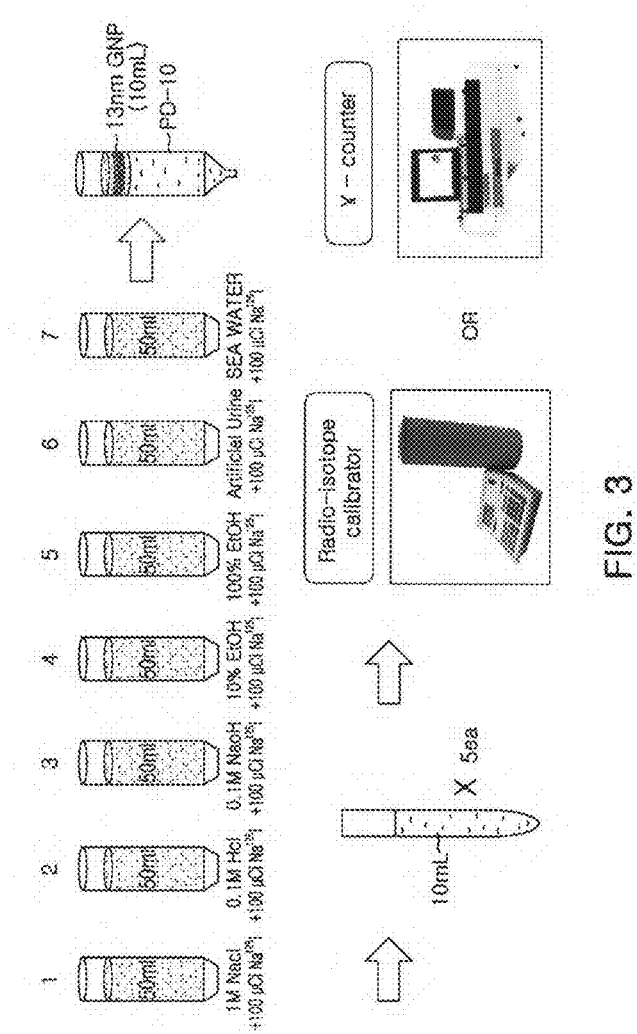
FIG. 3 schematically illustrates an overall test method using a PD-10 column.

Various types of aqueous solutions including 100 µCi of radioactive iodine-125 were poured into a PD-10 column in amounts of 50 mL, and a solution that passed through the PD-10 column was collected, as illustrated in FIGS. 2A and 2B. After all the various types of 50 mL of aqueous solutions were poured into the PD-10 column, 10 mL of water was further poured thereinto for washing the PD-10 column. With respect to 60 mL of the solution collected in such a manner, radioactive values were measured using a radioisotope calibrator or a gamma (γ)-counter. Using the radioactive values of the solution measured in such a process, a rate of the radioactive iodine-125 removed using the GNPs was calculated. The overall test process is as illustrated in FIG. 3.

(2) Removal Effect Test on Non-Radioactive Iodine

A test was performed to confirm whether non-radioactive sodium iodide (NaI) was removed by passing the NaI through the PD-10 column filled with 10 mL or 30 mL of GNPs, having a concentration of 10 nM.

As a result, it could be confirmed that a solution having a non-radioactive NaI concentration of 1 µM or 10 µM exhibited a relatively very high removal rate, as illustrated in Table 1 below. Further, it was confirmed that a solution having a non-radioactive NaI concentration of 100 µM exhibited about 25% of a radioactive iodine removal rate when 10 mL of GNPs were used and about 77% of a radioactive iodine removal rate when 30 mL of GNPs were used. An amount of the non-radioactive NaI that passed through the PD-10 column could be confirmed by an ultraviolet (UV) detector. As a result, it was confirmed that the non-radioactive NaI could be removed through the PD-10 column filled with the GNPs.

TABLE 1

Non-radioactive Iodine Removal Rate in Solution using PD-10 Column filled with 10 mL or 30 mL of Gold Nanoparticles having Concentration of 10 nM

| Iodine Concentration | Gold Nanoparticles (10 mL, 10 nM) Iodine Removal Rate | Gold Nanoparticles (30 mL, 10 nM) Iodine Removal Rate |
| --- | --- | --- |
| 1 µM | >99% | >99% |
| 10 µM | 93% | >99% |
| 100 µM | 25% | 77% |

(3) Removal Effect Test on Radioactive Iodine within Various Types of Solution

The same test was performed using radioactive iodine ([$^{125}$I]NaI). It could be observed that a PD-10 column filled with no GNPs exhibited less than 1% of a radioactive iodine removal rate. As a result, it was confirmed that the radioactive iodine was not specifically adsorbed onto the cross-linked dextran included in the PD-10 column.

Further, a test was performed, in the same manner, to confirm a removal rate of radioactive iodine included in various types of radioactive iodine solution.

The test was performed using, respectively, pure water, and 0.1 M HCl, 0.1 M NaOH, and 1.0 M NaCl aqueous solutions, including 100 µCi of radioactive iodine-125. As a result, it could be confirmed that about 99.9% of radioactive iodine was removed from both the 0.1 M HCl and 0.1 M NaOH aqueous solutions, and that the 0.1 M NaOH aqueous solution exhibited a slightly reduced radioactive iodine removal rate of about 99.0%, but still exhibited an excellent removal rate, as illustrated in Table 2 below.

Based on the results, the same test was performed on synthetic urine or seawater similar to an actual biometric sample. In both cases, it could be observed that most (about 99.5%) of radioactive iodine was removed (refer to Table 2 below).

The same test was performed on an organic solvent solution, such as a 10% ethanol aqueous solution or a 10% dimethyl sulfoxide aqueous solution, both including 100 µCi of radioactive iodine-125. As a result, it could be confirmed that about 99.8% of radioactive iodine was removed. Further, the same test was performed on 100% ethanol and 100% dimethyl sulfoxide. As a result, in both tests, about 99% of a high radioactive iodine removal rate was exhibited.

As seen by the test results, it could be confirmed that radioactive iodine dissolved in various types of aqueous solutions and organic solvents could be removed very efficiently, using the PD-10 column filled with the GNPs.

TABLE 2

Radioactive Iodine Removal Rate in Various Types of Solutions

| | Radioactive Iodine Removal Rate (%) |
|---|---|
| Pure Water | 99.99 |
| 0.1M HCl | 99.97 |
| 0.1M NaOH | 99.01 |
| 1.0M NaCl | 99.50 |
| Synthetic Urine | 99.99 |
| Seawater | 99.75 |
| 100% Ethanol | 99.99 |
| 10% Ethanol | 99.86 |
| 100% Dimethyl Sulfoxide | 99.01 |
| 10% Dimethyl Sulfoxide | 99.30 |

(4) Iodine Removal Effect Test According to Iodine Type

In order to confirm whether radioactive iodine removal capabilities could be exhibited using a PD-10 column filled with GNPs when iodine had cations rather than anions, such as NaI, radioactive iodine ([$^{125}$I]NaI) was reacted with a chloramine T oxidizer to thus be synthesized in the form of iodochloride ([$^{125}$I]ICl). The present test process was performed in a pure water solution. A radioactive iodine removal rate was observed for [$^{125}$I]ICl, using PD-10 columns, into which 10 mL and 30 mL of GNPs having a concentration of 10 nM were poured, respectively. The results are illustrated in Table 3 below.

It could be confirmed that when the GNPs were not used, about 34% of the radioactive iodine remained in the PD-10 columns. This is because a significant amount of radioactive iodine remains in the PD-10 column by a halogen bond between iodine cations (I$^+$) and a hydroxy group (—OH) of dextran included in the PD-10 columns.

It could be confirmed that the PD-10 column filled with GNPs exhibited a higher radioactive iodine removal rate, compared to a PD-10 column filled with no GNPs. Thus, it was confirmed that the PD-10 column filled with GNPs could be used to remove [$^{125}$I]ICl having sublimation properties.

TABLE 3

Radioactive Iodine ([$^{125}$I]ICl) Removal Rate in Aqueous Solution (Pure Water)

| Amount of Gold Nanoparticles (mL) | Radioactive Iodine Removal Rate |
|---|---|
| 0 | 34% |
| 10 | 62% |
| 30 | 72% |

Because it is known that [$^{125}$I]ICl has sublimation properties, it may be a material having a possibility of causing radioactive pollution in the air. Thus, a method of simply removing [$^{125}$I]ICl, as in an example given in this application, is expected to be very useful throughout the industry.

(5) Iodine Removal Effect Test According to Number of Repetitions of Iodine Removal Process The same amounts of radioactive iodine solution (50 mL, 100 μCi) were poured into PD-10 columns, filled with 10 mL and 30 mL of GNPs, having a concentration of 10 nM, over a period of 5 days. Then, a radioactive iodine removal rate was observed. Seawater and synthetic urine similar to an actual sample were used as the radioactive iodine solutions. The test results were measured and obtained using a gamma (γ)-counter, as illustrated in FIGS. 4 and 5, respectively.

As illustrated in FIGS. 4 and 5, a removal rate of radioactive iodine having a concentration of 100 μCi over 5 days was about 99.7%, in the case of the synthetic urine, and about 99.3% in the case of the seawater. Thus, as seen in the present test results, it could be confirmed that a dextran gel column filled with GNPs used to remove the radioactive iodine was very effective in removing radioactive iodine included in an aqueous solution.

3. Immobilization of Gold Particles Using Membrane Filter

Figure 6A:
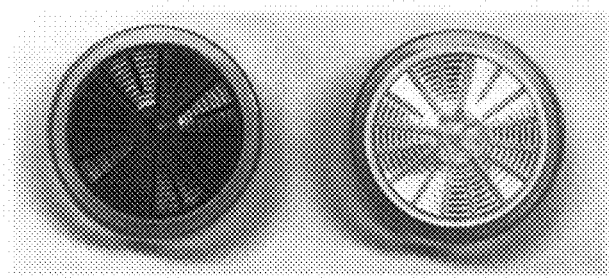
FIG. 6A illustrates a photograph of a cellulose acetate membrane filter (left) adsorbed with GNPs and a common cellulose acetate membrane filter (right)
Figure 6B:
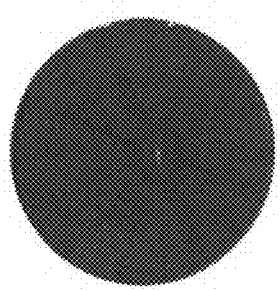
FIG. 6B illustrates a photograph of a cellulose acetate membrane adsorbed with GNPs.
Figures 7A, 7B:
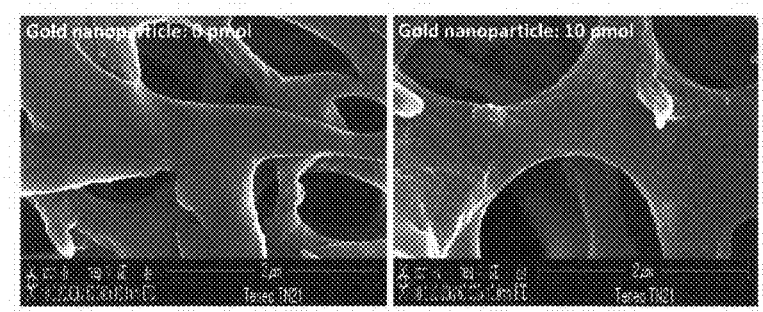
FIGS. 7A through 7D illustrate scanning electron microscope (SEM) images of a cellulose acetate membrane with nanoparticles immobilized thereon.
Figures 7C, 7D:
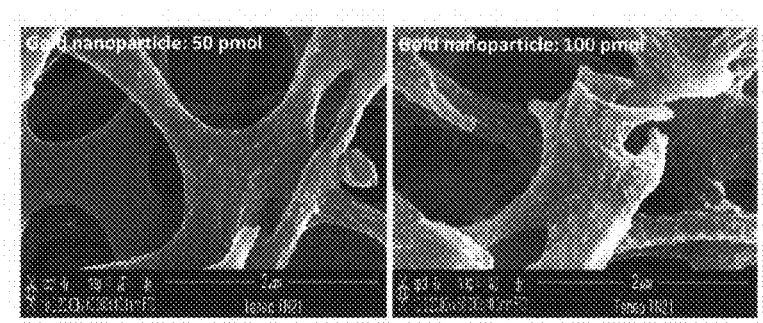

It could be confirmed that when 10 mL of GNPs, having an average particle diameter of 13 nm and capped with sodium citrate, were poured into a filter (0.45 μm) having a cellulose acetate membrane, after which the filter was washed with 30 mL of water, the GNPs were adsorbed onto the cellulose acetate membrane included in the filter (refer to FIGS. 6A and 6B).

As described above, 10 mL of the GNPs, capped with the sodium citrate, were filled in an injector, filtered by the filter, and confirmed by an UV detector. As a result, it was confirmed that when the GNPs were injected using the injector at a rate of 2 ml/min, 100% (72 pmol) of the GNPs could be adsorbed onto the cellulose acetate membrane.

It could be confirmed that 10, 50, or 100 pmol of GNPs were immobilized well on the cellulose acetate membrane in all tests. The test results could be confirmed using scanning electron microscopy (SEM) (refer to FIGS. 7A through 7D).

An iodine removal test was performed using the cellulose acetate membrane, having 100 pmol of the GNPs immobilized thereon. It could be confirmed that the GNPs immobilized in such a process were prevented from being eluted or diffused from the cellulose acetate membrane included in the filter and had a relatively high degree of stability without being aggregated for a long period of time, for example, more than two weeks.

4. Iodine Removal Test Using Membrane Filter (1) Test Process

An injector was filled with 50 mL of solution, including 100 μCi of radioactive iodine-125, and then a filter was connected to the injector. The solution was passed through the filter using a syringe pump or the like.

With respect to the 50 mL of solution collect after passing through the filter, radioactive values were measured using a radioisotope calibrator or a gamma (γ)-counter. Using the radioactive values measured in this process, a rate of radioactive iodine removed using the GNPs could be calculated.

Further, a test was performed in the same process as that described above by varying the number of filters.

A filter having no GNPs was used as a control group.

Ultimately, the solution, collected by pouring 100 mL of pure water into the filter adsorbed with the radioactive iodine-125, was measured using the gamma (γ)-counter to confirm whether GNPs or radioactive iodine was eluted.

Figure 8:
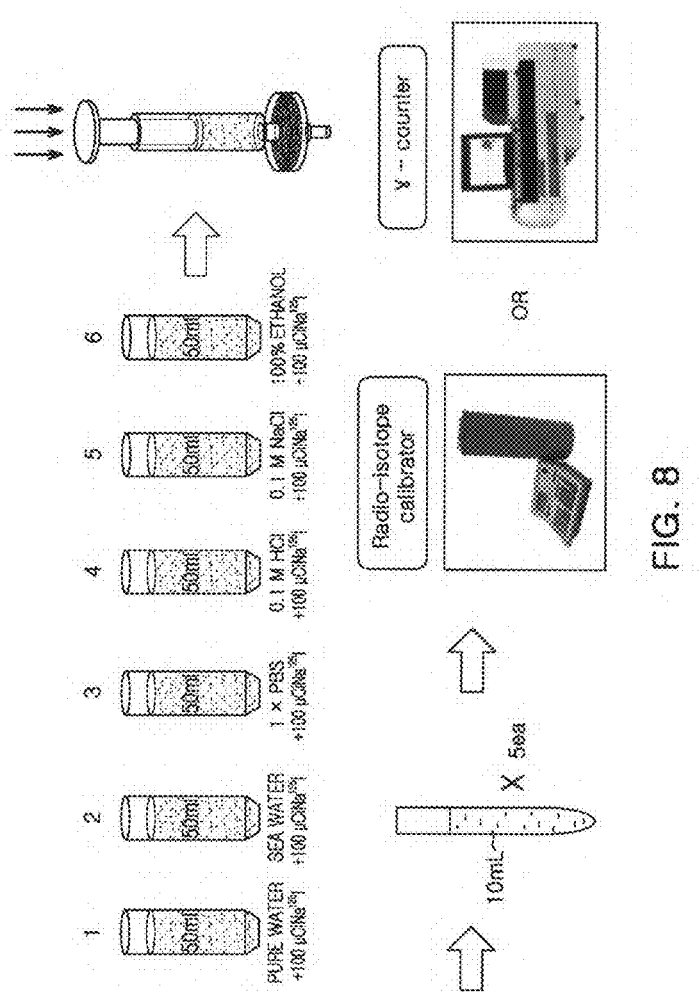
FIG. 8 schematically illustrates an overall iodine removal test process using a membrane filter.

The overall test process is illustrated in FIG. 8.

(2) Removal Effect Test on Radioactive Iodine within Various Types of Solution

A test was performed, in which 50 mL of an aqueous solution, including 100 μCi of radioactive iodine-125, was passed through a membrane filter, such as a cellulose acetate membrane filter adsorbed with GNPs or a common cellulose acetate membrane filter, using a syringe pump or the like, to confirm whether NaI had been removed from the aqueous solution.

It could be observed that the cellulose acetate membrane filter adsorbed with GNPs exhibited 99.90% of a radioactive iodine removal rate, while the common cellulose acetate membrane filter adsorbed with no GNPs exhibited less than 3% of a radioactive iodine removal rate. These results showed that the radioactive iodine was adsorbed well onto the GNPs of a cellulose acetate membrane included in the cellulose acetate membrane filter.

Subsequently, 100 mL of pure water was passed through a filter adsorbed with radioactive iodine to confirm whether GNPs or radioactive iodine-125 had been eluted. As a result, it was confirmed that none of the GNPs or the radioactive iodine-125 had been eluted.

In the same manner as described above, a test was performed to confirm radioactive iodine removal rates in various radioactive iodine solutions. Radioactive iodine removal rate results related to the various radioactive iodine solutions are illustrated in Table 4 below.

A test was performed using seawater, pure water, 0.1 M HCl, 0.1 M NaOH, and 1.0 M NaCl aqueous solutions, 100% ethanol, and 1× phosphate buffered saline (PBS, including NaCl 137 mmol, KCl 2.7 mmol, Na2HPO4 10 mmol, and KH2PO4 1.8 mmol), all including radioactive iodine-125 in an amount of 100 μCi. As a result, it could be observed that 99.7% or more of radioactive iodine was removed from the seawater, the pure water, the 0.1M NaOH and 1.0 M NaCl aqueous solutions, the 100% ethanol, and the 1×PBS, and yielded a radioactive iodine removal rate of 94.02%, even in the 0.1 M HCl aqueous solutions having a very low level of pH. In particular, 100 μCi of the radioactive iodine-125 exhibited 99.96%, a high radioactive iodine removal rate in the 100% ethanol.

TABLE 4

Radioactive Iodine Removal Rate in Various Types of Solutions

|  | Radioactive Iodine Removal Rate (%) |
|---|---|
| Pure Water | 99.90 |
| 0.1M HCl | 94.02 |
| 0.1M NaOH | 99.90 |
| 1.0M NaCl | 99.93 |
| Seawater | 99.77 |
| 100% Ethanol | 99.96 |
| 1 X PBS | 99.88 |

As the test results show, it could be confirmed that the radioactive iodine that was dissolved in various types of aqueous solutions and organic solvents could be removed very efficiently using the cellulose acetate membrane filter adsorbed with the GNPs.

(3) Removal Effect Test on Radioactive Iodine within Various Types of Solutions

A filter having GNPs immobilized thereon and used in the present test, may have the advantage of connecting a plurality of membranes. Using this advantage, the number of cellulose acetate membrane filters used to adsorb GNPs was increased, and the same test as described above was performed.

In more detail, one, two, or three cellulose acetate membrane filters adsorbed with GNPs were connected, respectively, and then 100 μCi of radioactive iodine-125 was injected thereinto, respectively. The test results are illustrated in Table 5 below.

TABLE 5

Radioactive Iodine Removal Rate in Pure Water according to Number of Filters adsorbed with Gold Nanoparticles

| Number of Filters | Radioactive Iodine Removal Rate |
|---|---|
| 1 | 99.90% |
| 2 | 99.99% |
| 3 | 99.99% |

Referring to Table 5 above, it could be confirmed that when two or three cellulose acetate membrane filters were provided, a radioactive iodine removal rate was increased up to 99.99%, compared to the case in which only one cellulose acetate membrane filter was provided.

In Table 5, a difference between the case of using two cellulose acetate membrane filters and the case of using three cellulose acetate membrane filters, when 100 μCi of the radioactive iodine-125 was provided in the aqueous solution, may not be confirmed. However, it may be expected that when the number of cellulose acetate membrane filters is increased to be more than 1, 99.99% or more of a radioactive iodine removal rate is exhibited in the case of removing radioactive iodine from 100 μCi or more.

(4) Removal Effect Test on Radioactive Iodine Over Time

A cellulose acetate membrane filter adsorbed with GNPs was applied in a desalting test on radioactive iodine (50 mL, 100 μCi) present in seawater and synthetic urine at a 24 hour interval. As a result, it could be confirmed that a minimum of 99% or more of a radioisotope removal rate was exhibited over a period of 7 days (refer to FIG. 9).

This indicates that a cellulose acetate membrane according to an example in the current application has excellent reusability, and that radioactive iodine, once adsorbed in a filter, does not escape from the filter.

When a radiation leakage accident occurs in a nuclear power plant, seawater is highly likely to be contaminated with a radioactive component, including radioactive iodine. Hospital patients' urine, including radioactive iodine emitted from large hospitals, may also become a potential pollution source of water.

Considering the above-mentioned results, the results of the present disclosure and, in particular, the cellulose acetate membrane filter adsorbed with the GNPs, is expected to be effectively applied to purify actual radioactive iodine waste water in the future.

As set forth above, according to the examples, a process for removing iodine, having significantly improved efficiency and ion selectivity, may be obtained. Thus, the process may be applied very efficiently to remove radioactive iodine from waste water generated in large hospitals and industrial facilities. In the future, a significant addition of economic value may be expected to be created in the industrial field related to the removal of radioactive iodine.

While exemplary embodiments have been shown and described above, it will be apparent to those skilled in the art that modifications and variations could be made without departing from the scope of the present invention, as defined by the appended claims.

What is claimed is:
1. A process for removing iodine using gold particles, a process comprising:
providing gold particles in stationary phase; and
contacting, in mobile phase, a solution including iodine, with the gold particles in stationary phase, wherein the iodine is adsorbed onto the gold particles and then removed.

2. The process of claim 1, wherein the solution is an aqueous solution, an organic solvent solution or a combination thereof.

3. The process of claim 2, wherein the aqueous solution is an acidic solution, a neutral solution or a basic solution.

4. The process of claim 1, wherein the gold particles has an average particle diameter of 1 nm to 1 μm.

5. The process of claim 1, wherein the providing the gold particles in stationary phase is performed by immobilizing the gold particles on a column or a membrane filter.

6. The process of claim 5, wherein the column is a PD-10 desalting column.

7. The process of claim 5, wherein the membrane filter includes a natural polymeric material, including sugar or amino sugar monomers.

8. The process of claim 7, wherein the natural polymeric material includes at least one selected from the group consisting of starch, cellulose, chitosan, and hyaluronic acid, or derivatives thereof.

9. The process of claim 1, wherein the iodine is at least one selected from the group consisting of iodine anions ($I^-$), iodine cations ($I^+$), iodate ions ($IO_3^-$) and iodine ($I_2$).

10. A process for removing iodine from waste water, the process performed by the process for removing iodine using gold particles according to claim 1.

* * * * *